No. 763,026. PATENTED JUNE 21, 1904.
W. J. SCHWEITZER.
APPARATUS FOR TREATING SEWAGE.
APPLICATION FILED JULY 31, 1903.
NO MODEL. 3 SHEETS—SHEET 1.
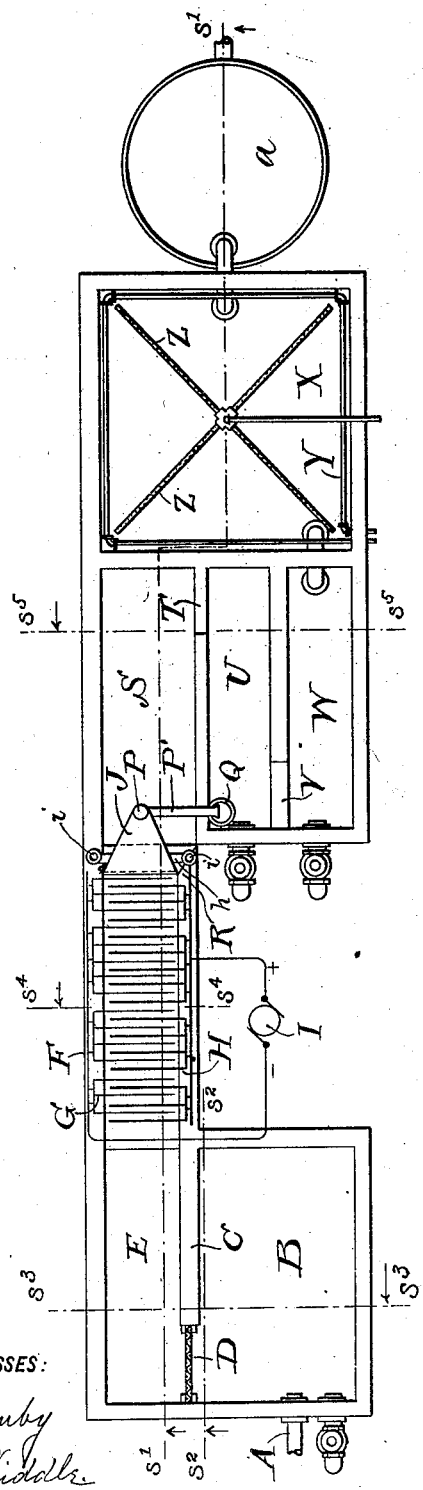
WITNESSES:
INVENTOR No. 763,026. PATENTED JUNE 21, 1904.
W. J. SCHWEITZER.
APPARATUS FOR TREATING SEWAGE.
APPLICATION FILED JULY 31, 1903.
NO MODEL. 3 SHEETS—SHEET 2.
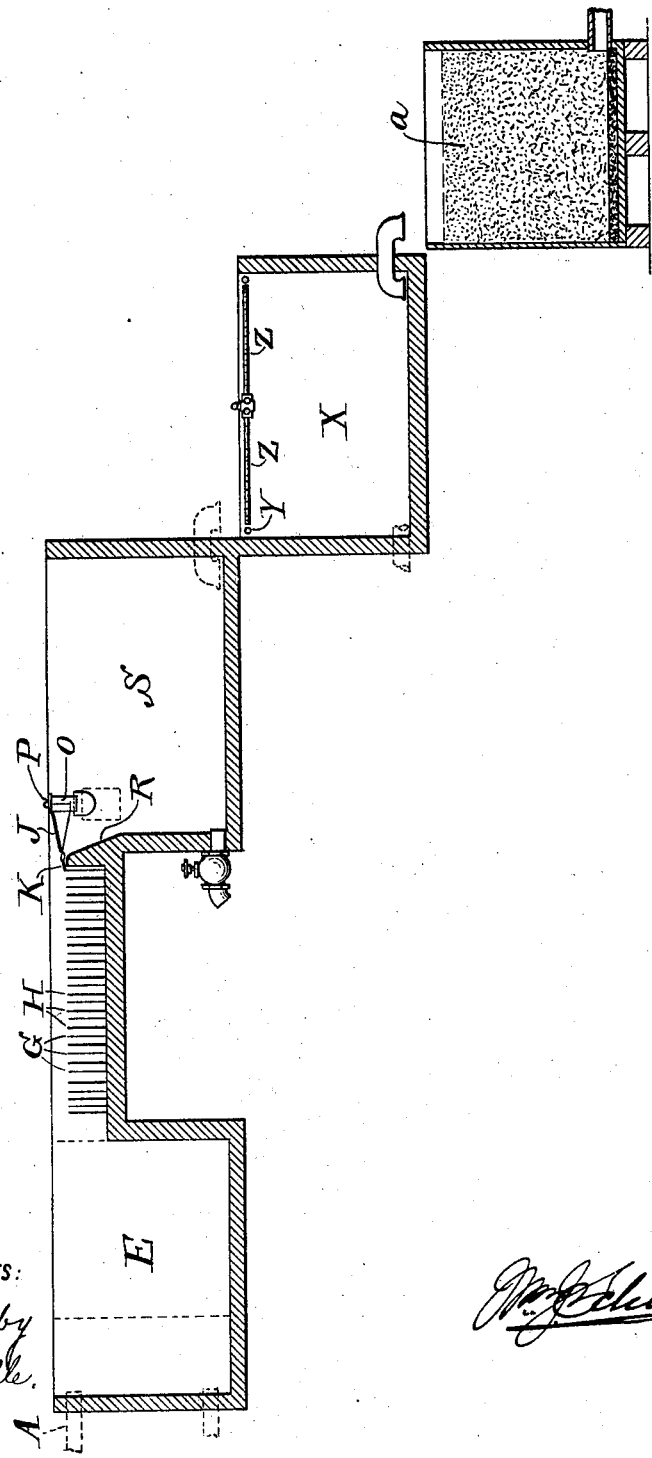

No. 763,026. PATENTED JUNE 21, 1904.
W. J. SCHWEITZER.
APPARATUS FOR TREATING SEWAGE.
APPLICATION FILED JULY 31, 1903.
NO MODEL. 3 SHEETS—SHEET 3.
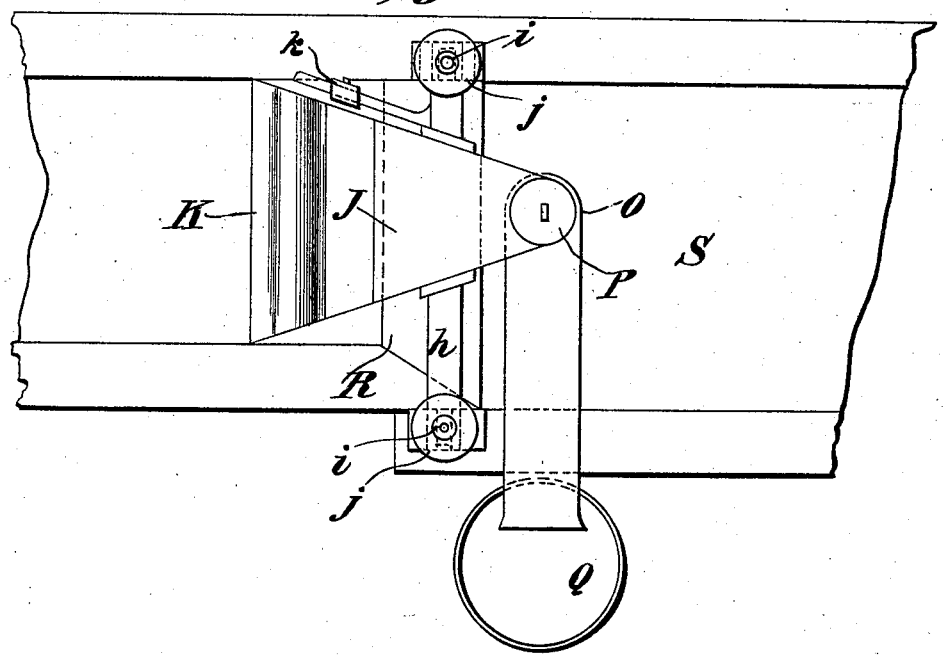
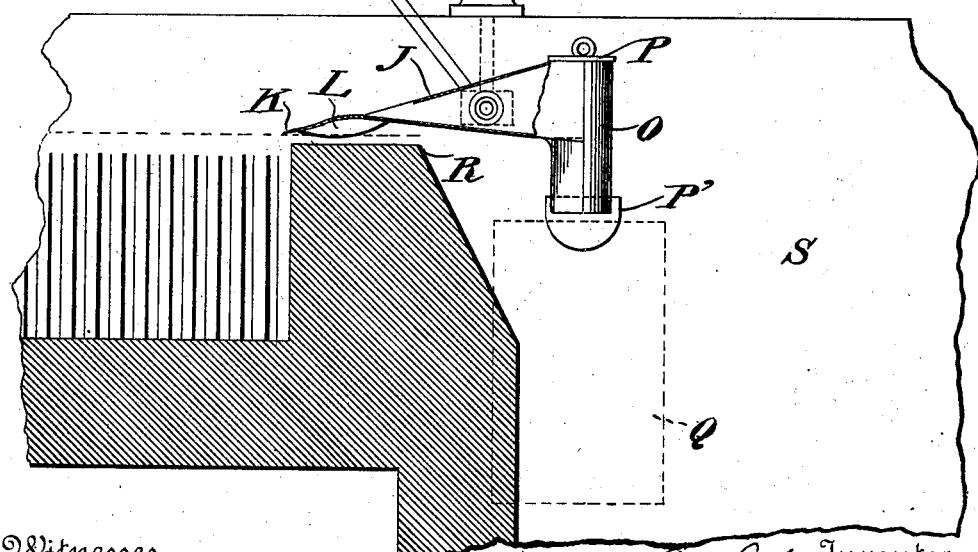

No. 763,026.

Patented June 21, 1904.

UNITED STATES PATENT OFFICE.

WILLIAM J. SCHWEITZER, OF WHITEPLAINS, NEW YORK.

APPARATUS FOR TREATING SEWAGE.

SPECIFICATION forming part of Letters Patent No. 763,026, dated June 21, 1904.

Application filed July 31, 1903. Serial No. 167,696. (No model.)

*To all whom it may concern:*

Be it known that I, WILLIAM J. SCHWEITZER, a citizen of the United States, residing at Whiteplains, in the county of Westchester, State of New York, have invented certain new and useful Improvements in Apparatus for Treating Sewage, of which the following is a full, clear, and exact description, reference being had to the accompanying drawings, forming a part of this specification.

My invention relates to apparatus for treating sewage and other fluids, having for its objects, primarily, the purification thereof in the sense of rendering it innocuous and inoffensive by the destruction of all germ life therein and, secondarily, the separation therefrom, first of all, solid matter, next of the greasy matter, and, finally, isolating the remaining solid matter from the contained water.

To these ends my present invention, hereinafter described, consists of the mechanical apparatus designed to accomplish the objects stated. Its essential and distinguishing features consist, broadly stated, of the combination in such an apparatus of a receiving tank or receptacle having an influent-conducting device with means to break the force of the inflow and divert its heavy, solid, inorganic, and non-putrescible matter to a settling and mixing chamber within or adjacent to said tank, means to conduct the remaining liquid and semiliquid matter to a sterilizing-chamber, an electrolyzer within said chamber, effluent-conducting means operating to retard the free discharge of the liquid and semiliquid therefrom, whereby it is given time to become completely and thoroughly deodorized and sterilized, and means, such as a settling chamber or chambers, to receive the effluent purified fluid and the sterilized organic matter as a precipitate.

My improved apparatus also consists, to enable it the better to accomplish more completely and perfectly all the objects stated, of a screening device in the inflow-tank, a grease-skimming device at the effluent end of the electrolyzing-chamber, adjusting devices to regulate the relative level of the connecting elements, and weirs operating in connection with the effluent settling-chamber.

These several features arranged in operative combination, both those stated above as constituting my present invention in its broadest form, as well as the additional features last above stated as constituting desirable elements adding to its efficiency, differentiate my apparatus from all prior devices in the same class and distinguish its novelty.

In the accompanying drawings, illustrating my improved apparatus in its best form, Figure 1 is a plan view of the apparatus; Fig. 2, a longitudinal sectional elevation on lines $S'$ $S'$ of Fig. 1; Fig. 3, a like section on line $S^2$ $S^2$ of Fig. 1 looking in the direction of the arrows; Fig. 4, a transverse section on line $S^3$ $S^3$ of Fig. 1 looking in the direction of the arrows; Fig. 5, a like section on line $S^4$ $S^4$ of Fig. 1 looking in the direction of the arrows; Fig. 6, a like section on line $S^5$ $S^5$ of Fig. 1 looking in the direction of the arrows. Fig. 7 is an enlarged detail plan view of the grease-skimming device; and Fig. 8 a side elevation, partly in section, taken through the grease-skimmer and that part of the apparatus with which it operates, as indicated in Fig. 7.

Referring to the drawings, A represents the pipe for the influent, which, as shown, empties into the receiving-tank B, and under the pressure due to the fall of the pipe A the sewage strikes against the baffle-walls C, which breaks the force of the flow and turns the influent through the screen D, which screen breaks up the semisolids which have not been broken up in flowing through the sewer. From the receiving-tank B after passing through the screen D the material passes into the settling-chamber E, the object of which is to afford provision for the precipitation of sand, silt, and other heavy matters which are held in suspension. The resultant effluent then enters the electrolyzer F, in which are situated the electrodes G and H, suitably connected with a generator or other source of electric current I and so connected that the electrodes H are positive and the electrodes G are negative. While any known form of electrolyzer may be employed, I prefer to employ as this element of the apparatus an electrolyzer of my invention and which is described in and forms the subject-matter of another application for Letters Patent filed July 31, 1903, Serial No. 167,695. The material in passing through the electrolyzer and coming in contact with the electrodes is here deodorized and disinfected, wholly or partially disintegrated, and certain of its component elements expelled in the form of gases through the chemical action of the electric current on the influent. As some of the products of electrolysis of sewage are grease and fatty matters which are in emulsion or suspension rise to the surface they may be removed by means of a suitable skimmer J. (Shown in detail in Figs. 7 and 8.) By that I do not mean that the electric current has any effect on the grease and fatty matters in the sewage, so far as I know, save to disintegrate it and per consequence separate the grease and fatty matter which rises to the surface; but that is the effect I am seeking in this part of my apparatus in order that the skimmer I have devised applied to the electrolyzing-chamber may remove the grease and fatty matter at the most appropriate and effective time in the process. While the skimmer J may be of any suitable construction, it is here shown as consisting of a light sheet-copper or light galvanized sheet-iron receptacle provided with a lip K, supported substantially on a level with the water-line or a little below the same by means of the air-chamber L, connected to the skimmer. It will be seen that the lip K extends substantially across the width of the electrolyzing-chamber F, and the skimmer, as shown, tapers in the direction of flow to a pipe O, provided with a cover P, for cleaning purposes. The pipe P connects with a trough P', supported upon the side of the apparatus and entering into a tank Q for the grease and fatty matters. The skimmer J, as shown, is fitted into the electrolyzing-tank just above the weir R, over which the material flows after electrolyzation into the grease extracting and settling tank S. Suitable means are provided for adjusting the position of the lip K relatively to the fluid-level. In this instance the skimmer J is supported upon a rod or bar $h$, connected at each end to the upright regulating-rods $i$, connected to be raised and lowered by the regulating hand-wheels $j$. A counterbalanced weight $k$ is connected to the skimmer for the purpose of steadying the same. From the tank S the material flows over the weir, T through tank U, and over the weir V into the tank W, the weir V being shown at a lower level than the weir T. The flow through these tanks S, U, and W is very slow to allow for settling and precipitation and for the coming to the surface of such grease and other suspended matter or material as have not been removed by the skimmer J. The resultant grease, fatty, or other matter or material in the tanks S, U, and W may be removed by any suitable mechanical means or by a skimmer similar to that described in connection with the skimmer J. From the tank W the effluent passes to the settling-chamber X, as shown, in this instance the chamber X being at a lower level than the tank S; but where it is not possible to provide this construction the chambers may be at substantially the same level and the material may be siphoned, pumped, or by any other suitable method carried from one chamber to the other. In the settling-chamber X the effluent is treated, primarily, with a weak solution of lime or any other precipitant, depending entirely upon the nature of the effluent to be treated. Such matters as are still in suspension and have not been precipitated in the tanks S, U, and W are precipitated in the chamber X. In the settling-chamber X means are provided for supplying air to the effluent, as shown, perforated air-supply pipes Y being placed along the outer walls of the chamber from which the air is forced against the sides of the chamber to precipitate such particles as are held in suspension in the effluent and to dislodge and precipitate such particles as have a tendency to lodge against the walls of the chamber. Suitable means are provided for injecting the precipitant into the chamber, as shown, pipes Z extending through the chamber and being connected, as shown. The precipitant-supply pipe need not be centrally located, but in any other suitable manner as may be consonant with good practice. From the settling-chamber X the effluent passes to any suitable filter, shown in this instance as a sand-filter $a$, and from the sand-filter an outlet is effected to either a stream or brook or to any other provision made for carrying off the effluent. In practice the settling-chamber X may be of any suitable form, either square, rectangular, or round, and the filter $a$ may be either the merchantable form of sand-filter, or where land is available filter-beds of the usual construction may be used. The resultant effluent in either case will be clear.

In reference to the electrolyzing element while excellent results may be obtained from the use of any known form of electrolytic apparatus adapted for the sterilization of water or semifluid organic matter I prefer to use for that element in this apparatus the electrolyzer of my invention heretofore referred to or at least so much thereof as I shall now refer to—namely, electrodes in the form of a comb having teeth which are trapezoidal-shaped in cross-section—whereby the contact-surface is increased, the shorter sides of the trapezoid-teeth being arranged in the electrolyzing-chamber facing in the direction from which the liquid sewage is flowing. The electrode-plates are arranged in the chamber with each alternate plate having its teeth in staggered relation to the next contiguous plate in the series. The electrodes if of cast-iron should be galvanized, as the electrochemical action on plain iron tends to neutralize the effect of the chlorin gas generated. Plain copper electrodes entirely avoid that effect. I have found that the best results are obtained with a current of five volts, and in the usual flow of sewage they drew the average of three amperes per gallon in the electrolyzer, with no saline taste noticeable in the filtered effluent.

My experience has taught me that sewage is generally sufficiently saline to contain sodium chlorid in quantity sufficient to produce when treated electrically enough chlorin gas to disinfect the mass; but if in any given case a deficiency may be suggested it may be supplied by adding common salt in the chamber B or in the electrolyzing-chamber, in which case the amperage will be increased to about five and one-half amperes per gallon with the same electrodes.

The drawings illustrate the most improved form of my invented apparatus which extensive experiments have proven to be best adapted to obtain the desired results. It may of course be modified or extended within the limits and principles of construction and mode of operation described and set forth hereinabove to meet any particular conditions or requirements.

By the use of this improved apparatus, operating as described, the sewage is deprived of its admixed mineral matter, strained and disintegrated, deodorized and disinfected, and then deprived of its greasy and fatty organic matters, and, finally, its solid organic matter isolated from the contained water. The sludge is to be removed from the tanks or chambers from time to time, as required. In practice the apparatus should be built and operated in duplicate, so as to permit the continuous operation of one section of the plant while the other is inoperative during cleaning. It may also be observed that the mineral matter, grease, and sludge isolated as aforesaid may be usefully applied for various purposes.

Having thus described my invention, what I claim as new, and desire to secure by Letters Patent, is—

1. In an apparatus for treating sewage, the combination and arrangement in sequence, of the following instrumentalities, a receiving-tank having an influent-conducting device, with means to separate out the heavy inorganic and non-putrescible solid matter in the inflow, from the liquid and semiliquid matters therein, a settling-chamber into which the latter is discharged, an electrolyzer-chamber, having an electrolyzer therein; means connecting said chambers; effluent-conducting means operating to retard its free discharge from the electrolyzing-chamber, and means to isolate the sterilized organic matter and discharge from said chamber the purified water only, of the effluent, substantially as described.

2. Apparatus for treating sewage and other fluids, comprising the following instrumentalities arranged and operating in sequence, namely a receiving-tank, an electrolyzer, a settling-chamber arranged between the two, a grease and sediment extracting and settling tank in communication with the electrolyzer, a filter, and settling-tanks between the grease and sediment extracting tank and the filter; substantially as set forth.

3. Apparatus for treating sewage and other fluids, comprising the following elements arranged and operating sequentially and in the order hereinafter stated, namely, a receiving-tank, an electrolyzer, a settling-chamber between the receiving-tank and the electrolyzer, a second settling-chamber, a grease and sediment extracting and settling tank between the electrolyzer and said settling-chamber, and means for injecting air into said chamber; substantially as set forth.

4. Apparatus for treating sewage and other fluids, comprising a receiving-tank, a settling-chamber communicating therewith, an electrolyzer, comb-like electrodes arranged within said electrolyzer, means for removing the floating grease, fatty, and other matters as the influent leaves the electrolyzer, a settling-chamber, grease and sediment extracting and settling tanks between the electrolyzer and said settling-chamber; substantially as set forth.

5. Apparatus for treating sewage and other fluids, comprising a receiving-tank for the influent, and a settling-chamber, with means for straining the influent arranged intermediate to the same, an electrolyzer, means for collecting the grease, fatty, and other matters, grease extracting and settling tanks, a settling-chamber communicating therewith, and means for filtering the effluent; substantially as set forth.

6. Apparatus for treating sewage and other fluids, comprising a receiving-chamber having a baffle-wall and a screen therein, an electrolyzer, a settling-chamber in communication therewith, means for removing the greasy matter before it reaches the settling-chamber, and a filter for the material after it leaves the settling-chamber, substantially as set forth.

7. Apparatus for treating sewage and other fluids, comprising a receiving-chamber, an electrolyzer, a skimmer, a grease-tank for receiving the material after it leaves the skimmer, a settling-chamber in communication with the grease-tank, and a filter in communication with the settling-chamber; substantially as set forth.

8. Apparatus for treating sewage and other fluids, comprising a receiving-chamber having a baffle-wall and a screen therein, an electrolyzer, grease extracting and settling tanks in communication with said electrolyzer, means for supplying precipitants to said tanks, and a filter, substantially as set forth.

9. Apparatus for treating sewage and other fluids, comprising a receiving-tank for the influent, a settling-chamber, a baffle-wall and strainer between said tank and chamber, an electrolyzer having electrodes and means for supplying current thereto, means for collecting grease, fatty, and other matters, grease extracting and settling tanks, weirs of different height between settling-tanks, over which the effluent passes, a settling-chamber provided with means for injecting precipitants thereinto, and means for leading air under pressure thereto, and means for filtering the effluent; substantially as set forth.

10. In an apparatus of the class described, comprising an electrolyzing-chamber, the combination therewith of a skimmer for removing grease, fatty, and other matters from the moving stream of liquid, said skimmer comprising a scoop having an edge buoyantly supported substantially on a level with the liquid, and means for collecting the material removed by the scoop.

11. In an apparatus of the class described, comprising an electrolyzing-chamber, the combination therewith of a skimmer for removing floating grease, fatty, and other matters from a moving stream of liquid, said skimmer comprising a scoop having an edge buoyantly supported substantially on a level with the liquid, means for collecting the material removed by the scoop and means for adjusting the height of the collecting edge of the scoop.

In testimony whereof I have hereunto affixed my signature this 28th day of July, A. D. 1903.

WILLIAM J. SCHWEITZER.

Witnesses:
W. W. CANBY,
I. IRVING COHN.